(12) United States Patent
Yang et al.

(10) Patent No.: US 8,280,257 B2
(45) Date of Patent: *Oct. 2, 2012

(54) SYSTEMS AND METHODS FOR SIDE-LOBE COMPENSATION IN RECONFIGURABLE OPTICAL ADD-DROP MULTIPLEXERS

(75) Inventors: Xiaohui Yang, Odenton, MD (US); Zhonghua Zhu, Essex, MD (US)

(73) Assignee: Ciena Corporation, Hanover, MD (US)

(*) Notice: Subject to any disclaimer, the term of this patent is extended or adjusted under 35 U.S.C. 154(b) by 707 days.

This patent is subject to a terminal disclaimer.

(21) Appl. No.: 11/930,831

(22) Filed: Oct. 31, 2007

(65) Prior Publication Data

US 2008/0232738 A1 Sep. 25, 2008

Related U.S. Application Data

(63) Continuation-in-part of application No. 11/726,934, filed on Mar. 23, 2007.

(51) Int. Cl.
*G02B 6/28* (2006.01)
*H04J 14/00* (2006.01)

(52) U.S. Cl. ............ 398/83; 398/25; 398/26; 398/45; 398/79

(58) Field of Classification Search .......... 398/83, 398/25, 26, 46, 79
See application file for complete search history.

(56) References Cited

U.S. PATENT DOCUMENTS

| | | | |
|---|---|---|---|
| 6,219,162 B1 * | 4/2001 | Barnard et al. ............. 398/9 |
| 6,275,330 B1 * | 8/2001 | Izumi ................. 359/341.42 |
| 6,288,810 B1 * | 9/2001 | Grasso et al. ............. 398/9 |
| 6,559,985 B1 * | 5/2003 | DeGrange et al. ........... 398/5 |
| 7,254,292 B2 * | 8/2007 | Tian et al. ................ 385/17 |
| 7,587,139 B1 * | 9/2009 | Bonnedal et al. .......... 398/83 |
| 2001/0053025 A1 * | 12/2001 | Zhao ..................... 359/497 |
| 2002/0101633 A1 * | 8/2002 | Onaka et al. ............. 359/119 |
| 2002/0177965 A1 * | 11/2002 | Tomlinson .............. 702/85 |
| 2002/0186459 A1 * | 12/2002 | DeGrange et al. ........ 359/341.4 |
| 2002/0196495 A1 * | 12/2002 | Grasso et al. ............ 359/127 |
| 2003/0025990 A1 * | 2/2003 | DeGrange et al. ........ 359/341.4 |
| 2003/0138254 A1 * | 7/2003 | Otsuka et al. ............. 398/85 |
| 2003/0151803 A1 * | 8/2003 | DeGrange et al. ....... 359/341.41 |
| 2004/0081421 A1 * | 4/2004 | Mori et al. .............. 385/140 |
| 2004/0109635 A1 * | 6/2004 | Zhong et al. .............. 385/24 |
| 2004/0146306 A1 * | 7/2004 | Muzicant et al. .......... 398/177 |
| 2004/0156094 A1 * | 8/2004 | Kawahara et al. ......... 359/333 |
| 2004/0165813 A1 * | 8/2004 | Kouns ................... 385/16 |
| 2004/0213508 A1 * | 10/2004 | Shahar et al. ............. 385/16 |
| 2005/0157380 A1 * | 7/2005 | Hatae et al. ............. 359/341.41 |
| 2005/0226621 A1 * | 10/2005 | Kikuchi et al. ............ 398/83 |
| 2006/0034610 A1 * | 2/2006 | Akiyama et al. ........... 398/83 |

(Continued)

*Primary Examiner* — Nathan Curs
*Assistant Examiner* — Tanya Ngo
(74) *Attorney, Agent, or Firm* — Clements Bernard PLLC; Christopher L. Bernard; Lawrence A. Baratta, Jr.

(57) ABSTRACT

Systems and methods to reduce passband side-lobes associated with WSS-based ROADMs by applying a filter on each channel are provided. In an exemplary embodiment, a comb filter, such as a thin film filter or an interleaver, is utilized. Additionally, the present invention provides systems and methods to adaptively control amplifier target power and per wavelength target power to maintain signal launching power as per design in networks with WSS-based ROADMs. Accordingly, signal OSNR does not collapse faster than other similar configured system without WSS-based ROADM. In order to correct amplifier target power, the present invention utilizes system information about side-lobe size and OSNR at each amplifier.

13 Claims, 17 Drawing Sheets

U.S. PATENT DOCUMENTS

| | | | |
|---|---|---|---|
| 2006/0072918 A1* | 4/2006 | Gerstel et al. | 398/83 |
| 2006/0093257 A1* | 5/2006 | Aota et al. | 385/18 |
| 2006/0093258 A1* | 5/2006 | Terahara et al. | 385/18 |
| 2006/0098983 A1* | 5/2006 | Han et al. | 398/83 |
| 2006/0104641 A1* | 5/2006 | Casanova et al. | 398/83 |
| 2006/0115210 A1* | 6/2006 | Nakagawa | 385/24 |
| 2006/0177225 A1* | 8/2006 | Paraschis et al. | 398/87 |
| 2006/0221435 A1* | 10/2006 | Maeda et al. | 359/337 |
| 2007/0014513 A1* | 1/2007 | Isomura et al. | 385/24 |
| 2007/0110353 A1* | 5/2007 | Sargent | 385/10 |
| 2007/0116468 A1* | 5/2007 | Ji et al. | 398/79 |
| 2007/0274725 A1* | 11/2007 | Takeyama et al. | 398/93 |
| 2008/0002978 A1* | 1/2008 | Onaka et al. | 398/81 |
| 2008/0074731 A1* | 3/2008 | Takeyama et al. | 359/333 |
| 2008/0080865 A1* | 4/2008 | Muro et al. | 398/83 |
| 2008/0267631 A1* | 10/2008 | Collings et al. | 398/97 |

\* cited by examiner

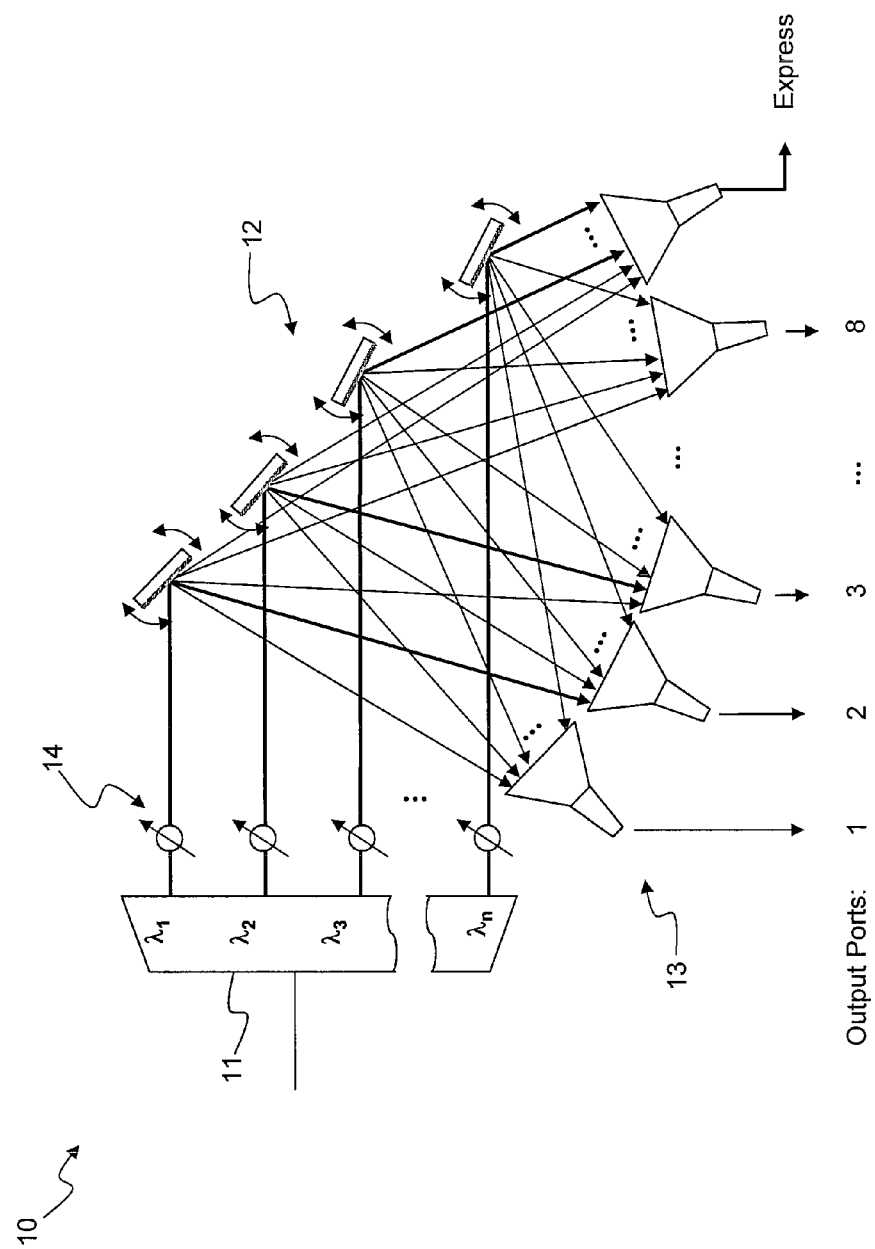
FIG. 1. *Prior Art*

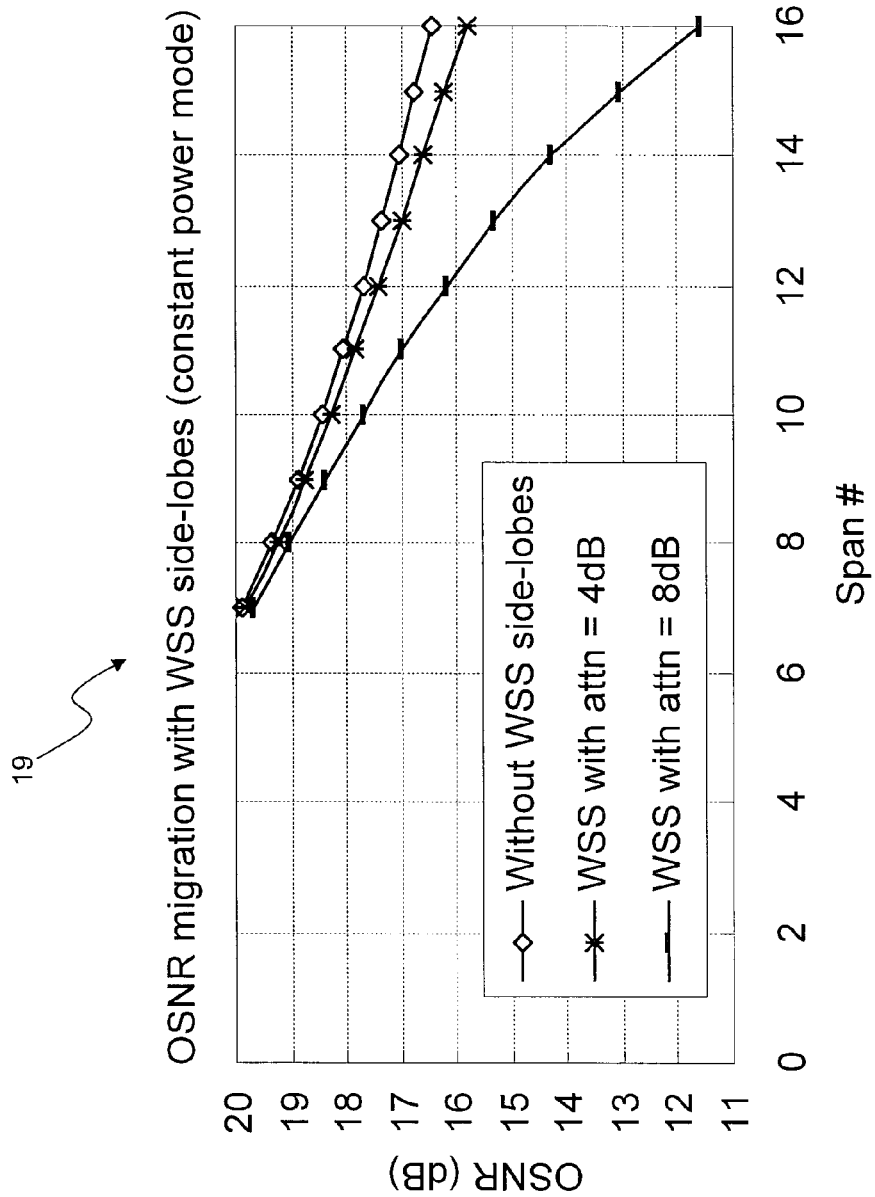
FIG. 3. *Prior Art*

SYSTEMS AND METHODS FOR SIDE-LOBE COMPENSATION IN RECONFIGURABLE OPTICAL ADD-DROP MULTIPLEXERS

CROSS-REFERENCE TO RELATED APPLICATION(S)

This application is a continuation-in-part of co-pending U.S. patent application Ser. No. 11/726,934 filed Mar. 23, 2007, and entitled "SYSTEMS AND METHODS FOR ADAPTIVE GAIN CONTROL TO COMPENSATE OSNR PENALTY CAUSED BY SIDE-LOBE OF MEMS-BASED RECONFIGURABLE OPTICAL ADD-DROP MULTI-PLEXERS," the contents of which are incorporated in full by reference herein.

FIELD OF THE INVENTION

The present invention relates generally to optical networks. More specifically, the present invention relates to systems and methods for comb filters to compensate for an optical signal-to-noise ratio (OSNR) penalty caused by the side-lobes created by wavelength selective switch (WSS)-based reconfigurable optical add-drop multiplexers (ROADMs) using micro-electromechanical systems (MEMS) or liquid-crystal modulators (LCM).

BACKGROUND OF THE INVENTION

Amplified spontaneous emission (ASE) noise is one of the main noise sources in optical amplifiers. ASE is initiated by spontaneous decay of electrons, creating photons which could travel in any direction. In modern optical amplified systems, after propagating multiple spans, accumulated ASE noise is not negligible compared to wavelength division multiplexed (WDM) signals. For both constant power and constant gain amplifier control, if ASE power is not considered in the total target output power at each network node, a system will take penalty due to lower than expected channel launch power since significant ASE will share the total output power of the amplifier with the WDM signals. With state-of-the-art amplifier control schemes, ASE compensation has been implemented; however, this ASE compensation assumes ASE is evenly distributed across each channel. This assumption was valid for traditional optical networks which include fixed optical add-drop multiplexers.

In a normal amplified system, noise across channel is either evenly distributed or filtered down by channelized devices. However, the addition of reconfigurable optical add-drop multiplexers (ROADMs) alters this assumption. ROADMs are a form of optical add-drop multiplexer that adds the ability to remotely and dynamically switch traffic from a WDM system at the wavelength layer. This allows individual wavelengths carrying data channels to be added and dropped from a fiber without the need to convert the signals on all of the WDM channels to electronic signals and back again to optical signals.

Referring to FIG. 1, an exemplary embodiment of a micro-electromechanical system (MEMS)-based wavelength-selective switch (WSS) 10 is illustrated. An input fiber including multiple wavelengths $\lambda_1, \lambda_2, \ldots \lambda_n$ of optical signals is input into a de-multiplexer 11, such as a diffraction grating. The de-multiplexer 11 separates each wavelength from the common input, and optionally a variable optical attenuator (VOA) 14 can be included following the de-multiplexer 11. VOAs 14 are configured to provide variable attenuation to the wavelength, and the VOAs 14 can be remotely and dynamically set to a range of values. The WSS 10 includes a MEMS mirror 12 for each of the wavelengths $\lambda_1, \lambda_2, \ldots \lambda_n$. The MEMS mirror 12 is a micro-mirror that deflects the optical signal to an appropriate output port 13. Advantageously, the WSS 10 is fully reconfigurable for adding, dropping, and expressing through optical signals. Since there is a MEMS mirror 12 for each of the optical signals, any signal can be dropped to any of the output ports 13. Additionally, multiple wavelengths including all wavelengths can be dropped to a single port 13, such as an express port.

Referring to FIGS. 2a and 2b, WSSs 15,16 are configured to direct each wavelength from a common input port to any one of multiple (e.g., "N") output ports. To indicate device fan out, these devices are often classified as "1×N" devices, with a "1×9" WSS meaning a 10 port device, with 1 common input and 9 output ports. For example, the WSS 15 is a 1×9 WSS with a common input, eight drop ports, and one express port. The WSS 15 can be utilized at a node where up to eight optical signals need to be dropped, with the remaining optical signals pass through as express signals. Alternatively, the WSS 16 utilizes the same hardware configured for multiple express ports, such as where a node has multiple degree interconnection. Advantageously, the WSS 15,16 provides nodal flexibility to add, drop, and express optical signals with the same MEMS-based hardware.

Disadvantageously, MEMS-based WSSs have side-lobes for each channel. The side-lobes are a passband distortion caused by channel attenuation or filter cascading. Currently the designs of ROADM are either based on MEMS tilting mirror array or liquid-crystal modulators (LCM). Note, the passband sag at the edges are possible in both technologies. Furthermore, in practice, both MEMS and LCM devices may require that a finite gap exist between adjacent pixels. The edge effects are known to cause attenuation dependent passband side-lobe.

Generally, the side-lobes are located out of signal bandwidth, leading to more noise pass through in the WSS than a traditional system (without WSS), which has an evenly distributed ASE across channel. In this case, even with current ASE migration compensation scheme, the total ASE power can still be under-estimated. When multiple ROADMs are present in a network, the cascading effect will lead the side-lobes to grow along the spans, and the accumulated noise power can increase much faster than traditional flat-noise system. The severe under-estimating accumulated ASE power will cause unexpected signal power drop and lead to OSNR penalty in the system. The OSNR penalty introduced by WSS side-lobes is mainly caused by launching lower than expected signal power into the system along the amplifier chain, due to larger than expected ASE and under-estimated amplifier target power, i.e. side-lobes utilize amplifier power designated for the signal bandwidth.

Further, if a WSS is used to realize a dynamic gain equalization (DGE) function in networks, large dynamic range of attenuation on every channel through WSS is needed. Meanwhile, the size of side-lobes of a WSS is dependent on the attenuation of the WSS. Normally, the higher of the attenuation of the WSS, the bigger the side-lobes, and the more unexpected ASE can accumulate along the system.

Referring to FIG. 3, graph 19 illustrates a study showing a network of up to 16 spans with a ROADM at every network node (noise figure=9, span loss=20 dB). With a typical WSS side-lobe, when WSS attenuation is set at 0 dB (no side-lobe), 4 dB (typical) and 8 dB (worst case), and assuming all the channels have same attenuation, optical signal-to-noise ratio (OSNR) migration in the network has been calculated. In a typical WSS scenario (i.e., WSS attenuation=4 dB) more than ½ dB OSNR penalty has been observed after propagation through 16 ROADMs; and for the highest attenuation (i.e., 8 dB), more than 4 dB OSNR penalty can be incurred by the system. This study was performed assuming each WSS is working at typical conditions. Alternatively, if the WSSs are working at the worst-case condition in their specification, the system has to take even more OSNR penalty due to the side-lobes. Accordingly, side-lobes due to WSS ROADMs significantly impair network performance, and current systems and methods are inadequate for compensation. Thus, systems and methods are needed to compensate for the OSNR penalty caused by the side-lobe of MEMS-based ROADMs.

BRIEF SUMMARY OF THE INVENTION

In various exemplary embodiments, the present invention provides systems and methods to reduce passband side-lobes associated with WSS-based ROADMs by applying a filter on each channel. In an exemplary embodiment, a comb filter, such as a thin film filter or an interleaver, is utilized. Additionally, the present invention provides systems and methods to adaptively control amplifier target power and per wavelength target power to maintain signal launching power as per design in networks with WSS-based ROADMs. Accordingly, signal OSNR does not collapse faster than other similar configured system without WSS-based ROADM. In order to correct amplifier target power, the present invention utilizes system information about side-lobe size and OSNR at each amplifier. Related information, such as ASE level and size of side-lobes at each channel from upstream amplifiers, is passed to a network controller at each amplifier. Meanwhile, with target signal level and local WSS attenuation setting (given side-lobe size vs. WSS attenuation known) of each channel, the amplifier calculates what its total output power should be and adaptively maintains that power.

Advantageously, the present invention largely solves OSNR penalty caused by side-lobes of WSS-based ROADM. The adaptive amplifier control of the present invention can correctly estimate the amount of ASE with knowledge of the system and correlation between side-lobe size and WSS channel attenuation. The ASE level and the side lobe size are calculated based on the amplifier gain, noise figure and the attenuation settings. The comb-filter based compensation can be utilized along with the adaptive gain control scheme, and placed at locations where amplifiers are close to maximum output power or as required by network design.

In an exemplary embodiment of the present invention, a reconfigurable optical add-drop multiplexer node with side-lobe compensation includes an optical pre-amplifier including an input with multiple wavelengths, a wavelength selective switch connected to the optical pre-amplifier, wherein the wavelength selective switch includes a variable optical attenuator on a connection from the optical pre-amplifier and a filter for each of the multiple wavelengths, and wherein the wavelength selective switch is configured to drop a plurality of wavelengths of the multiple wavelengths, an optical post-amplifier connected to a coupler including a variable optical attenuator on each of a plurality of input ports, wherein the coupler is configured to add a second plurality of wavelengths, and an optical monitor configured to monitor optical power of each of the multiple wavelengths at the optical pre-amplifier. Optionally, the filter includes a comb filter including one of a thin film filter and an interleaver. The filter is located at one of each of a plurality of outputs of the wavelength selective switch and an input of the wavelength selective switch. Optionally, each of the variable optical attenuators is adaptively adjusted responsive to amplified spontaneous emission power located in side-lobes of each of the multiple wavelengths, and the gain of the optical pre-amplifier and post-amplifier is set to a target output value plus the sum of the amplified spontaneous emission powers in located in side-lobes of each of the multiple wavelengths.

Alternatively, the reconfigurable optical add-drop multiplexer node further includes a node controller communicatively coupled to the optical pre and post amplifier, the wavelength selective switch, and the optical monitor, and the node controller is configured to measure power for each wavelength of the multiple wavelengths at a node using the optical monitor, calculate amplified spontaneous emission power located in side-lobes of each wavelength, and for each wavelength not at a target power value, adjust power of the wavelength responsive to the amplified spontaneous emission power located in side-lobes of each of the multiple wavelengths. Optionally, the amplified spontaneous emission power located in side-lobes of each of the multiple wavelengths is calculated responsive to a derived formula for a side-lobe penalty based on the micro-electromechanical system-based wavelength selective switch attenuation, and the side-lobe penalty is defined as a ratio with amplified spontaneous emission side-lobe divided by amplified spontaneous emission without side-lobe. Alternatively, the formula is derived responsive to the wavelength selective switch utilized in the reconfigurable optical add-drop multiplexer.

In another exemplary embodiment of the present invention, a wavelength selective switch with side-lobe compensation includes an input port, a plurality of output ports connected to the input port through a switching device, wherein the switching device is configured to switch wavelengths from the input port to each of the plurality of output ports, and a comb filter configured to filter wavelengths input and output from the wavelength selective switch, wherein the comb filter includes a passband at and around the center frequency of each of the wavelengths and attenuation at side-lobes for each of the wavelengths. Optionally, the comb filter includes one of a thin film filter and an interleaver. Alternatively, the switching device includes one of a micro-electromechanical system mirrors and liquid-crystal modulators. The comb filter is located at one of each of a plurality of outputs of the wavelength selective switch and an input of the wavelength selective switch.

BRIEF DESCRIPTION OF THE DRAWINGS

The present invention is illustrated and described herein with reference to the various drawings, in which like reference numbers denote like system components and/or method steps, respectively, and in which:

FIG. 1 is a diagram of an exemplary embodiment of a micro-electromechanical system (MEMS)-based wavelength-selective switch (WSS);

FIG. 3 is a graph illustrating a study showing a network of up to 16 spans with a ROADM at every network node and the OSNR migration due to WSS-based ROADMs;

DETAILED DESCRIPTION OF THE INVENTION

In various exemplary embodiments, the present invention provides systems and methods to reduce passband side-lobes associated with WSS-based ROADMs by applying a filter on each channel. In an exemplary embodiment, a comb filter, such as a thin film filter or an interleaver, is utilized. Additionally, the present invention provides systems and methods to adaptively control amplifier target power and per wavelength target power to maintain signal launching power as per design in networks with WSS-based ROADMs. Accordingly, signal OSNR does not collapse faster than other similar configured system without WSS-based ROADM. In order to correct amplifier target power, the present invention utilizes system information about side-lobe size and OSNR at each amplifier. Related information, such as ASE level and size of side-lobes at each channel from upstream amplifiers, is passed to a network controller at each amplifier. Meanwhile, with target signal level and local WSS attenuation setting (given side-lobe size vs. WSS attenuation known) of each channel, the amplifier calculates what its total output power should be and adaptively maintains that power.

Advantageously, the present invention largely solves OSNR penalty caused by side-lobes of WSS-based ROADM. The adaptive amplifier control of the present invention can correctly estimate the amount of ASE with knowledge of the system and correlation between side-lobe size and WSS channel attenuation. The ASE level and the side lobe size are calculated based on the amplifier gain, noise figure and the attenuation settings. The comb-filter based compensation can be utilized along with the adaptive gain control scheme, and placed at locations where amplifiers are close to maximum output power or as required by network design.

Figure 4:
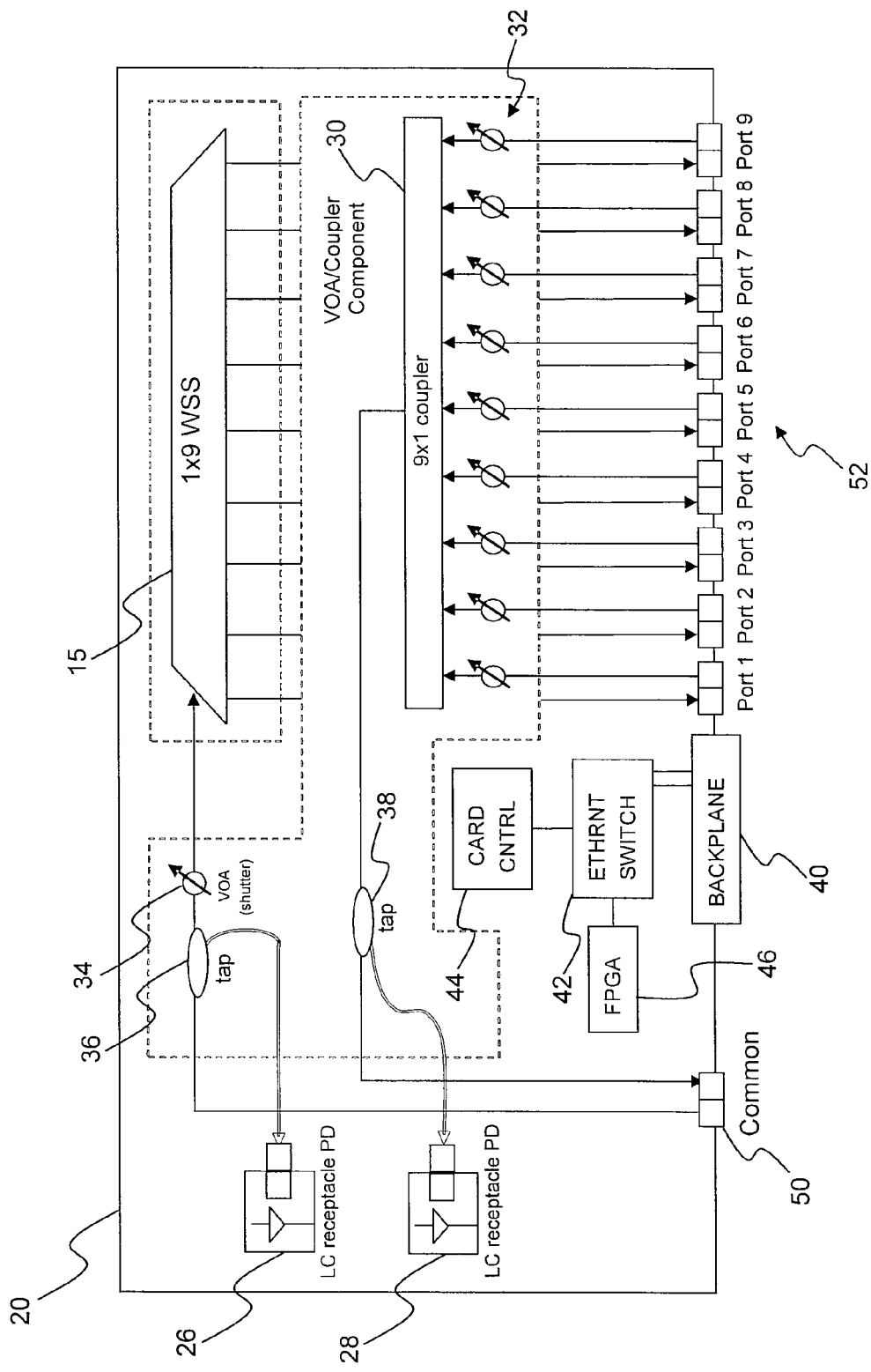
FIG. 4 is a block diagram illustrating an exemplary embodiment of a 1×9 WSS in a ROADM device.

Referring to FIG. 4, an exemplary embodiment of a ROADM 20 network element includes a 1×9 WSS 15 to drop wavelengths from a common port 50 and a 9:1 coupler 30 to add wavelengths from ports 52 to the common port 50. The common port 50 includes an input and an output. The WSS 15 is configured to perform de-multiplexing, independently routing each wavelength from input of the common port 50 to any of the ports 52. A VOA 34 is located on the common port 50 input prior to the WSS 15. The VOA 34 is used to provide variable attenuation to the common port 50 signal prior to the WSS 15. Additionally, a tap 36 can be included to provide an optical tap (e.g., 5% power tap) to allow a monitoring port 26 to view the signal prior to the WSS 15. VOA 34 as shown here affects all the wavelengths simultaneously. The VOA 34, however, is built into the WSS 15 device. Accordingly, VOA 34 is an array of VOAs that can control the power in each port separately. This is physically realized by moving mirrors in the z direction in the WSS 15 to control the amount of light coupled. VOA 34 as shown here affects all the wavelengths simultaneously.

In the opposite propagation direction, signals from the ports 52 are passively combined in the coupler 30 with the combined signal emitted from an output at the common port 50. VOAs 32 are located at the input of the ports 52 to the coupler 30 to provide variable attenuation prior to the passive coupler 30. The coupler 30 can be configured to perform color-less multiplexing, i.e. multiplexing independent of wavelength allowing any wavelengths to be multiplexed by the coupler 30. Additionally, a tap 38 can be included to provide an optical tap (e.g., 5% power tap) to allow a monitoring port 28 to view the signal after the coupler 30.

The ROADM 20 also includes a backplane 40 connection providing electrical access to a backplane. For example, the backplane 40 connection can allow the ROADM 20 to receive software, communication, etc. from a shelf containing the ROADM 20. Additionally, the ROADM 20 includes functions such as card control 44, an Ethernet switch 42, and an field programmable gate array (FPGA) 46. The card control 44 supports card functions such as maintenance and alarms, provisioning, and the like. The Ethernet switch 42 connects to the FPGA 46, card control 44, and backplane 40 allowing communications between these various functions and the external shelf. Advantageously, the Ethernet switch 42 and backplane 40 allow remote provisioning of the ROADM 20 along with operations, administration, and maintenance (OAM). In an exemplary embodiment of the present invention, the ROADM 20 utilizes these functions 40, 42, 44, 46 to communicate status of the ROADM 20 and to appropriate adjust VOA settings responsive to the adaptive gain control of the present invention.

Figure 5:
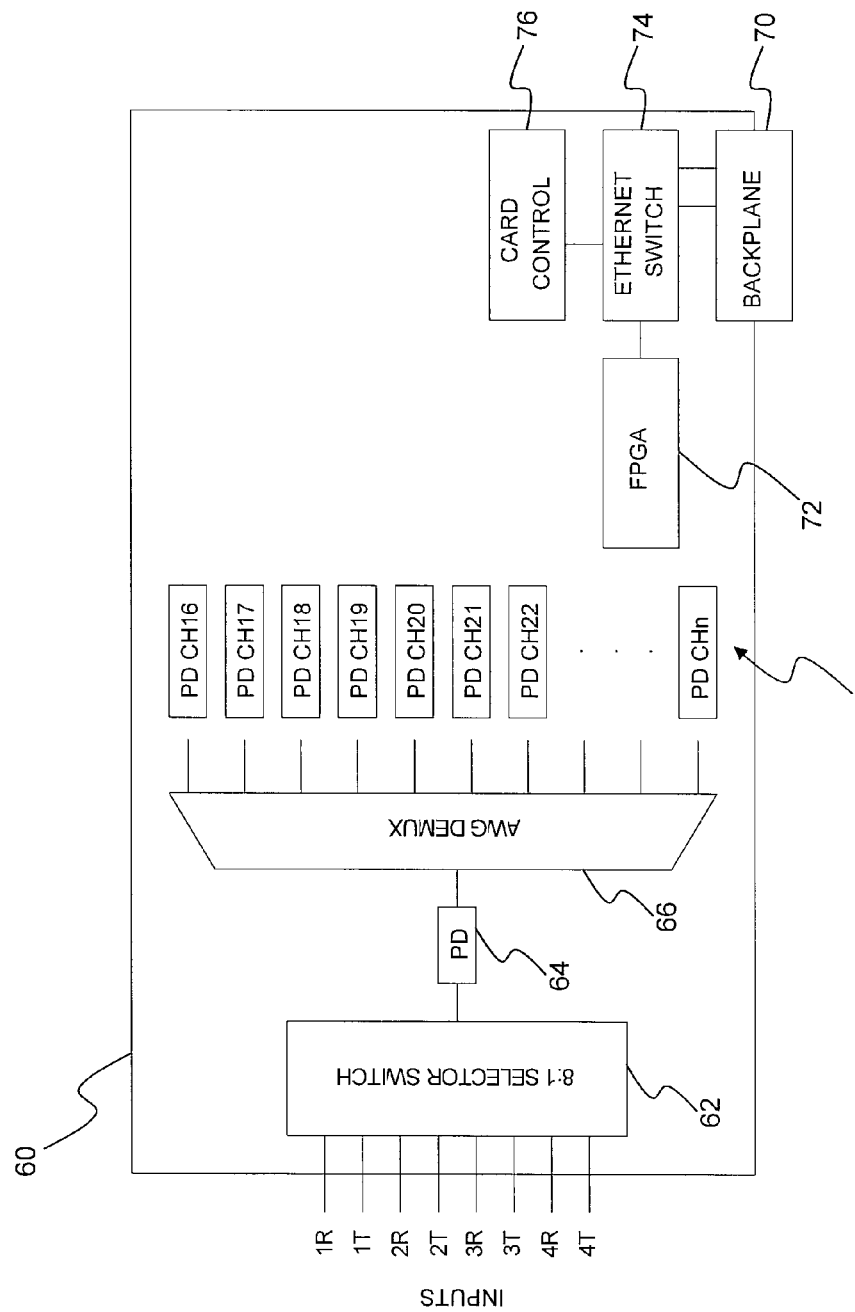
FIG. 5 is a block diagram illustrating an exemplary embodiment of an optical channel monitor operable to non-intrusively monitor optical signal power.

Referring to FIG. 5, an exemplary embodiment of a optical channel monitor (OCM) 60 includes a selector switch 62 and a plurality of photo-detectors (PD) 64,68. The OCM 60 is configured to use the selector switch 62 to alternately direct one of eight optical inputs to a PD 64 before being input into an array waveguide grating (AWG) 66 to be de-multiplexed to one of the n PDs 68. The OCM 60 is configured to measure the output power of each of n wavelengths in an input signal. The inputs to the selector switch 62 are configured according to the ROADM requirements. For example, a 1×9 ROADM can require two OCM 60 units to measure all of the power levels of each wavelength.

Additionally, the OCM 60 includes a backplane 70 connection along with card control 76, an Ethernet switch 74, and an FPGA 72. These components are operable to report the measured power levels of each wavelength to the ROADM, management systems, and the like. As described further below, the present invention utilizes power measurements to perform adaptive gain control to reduce OSNR penalty due to side-lobes. Those of ordinary skill in the art will recognize other variations of the OCM 60 can be utilized to provide per-wavelength power monitoring for all the inputs and outputs of the ROADM system. For example, any module which measures per-wavelength output power for all the inputs and outputs of the ROADM system can be utilized with the present invention.

Figure 6:
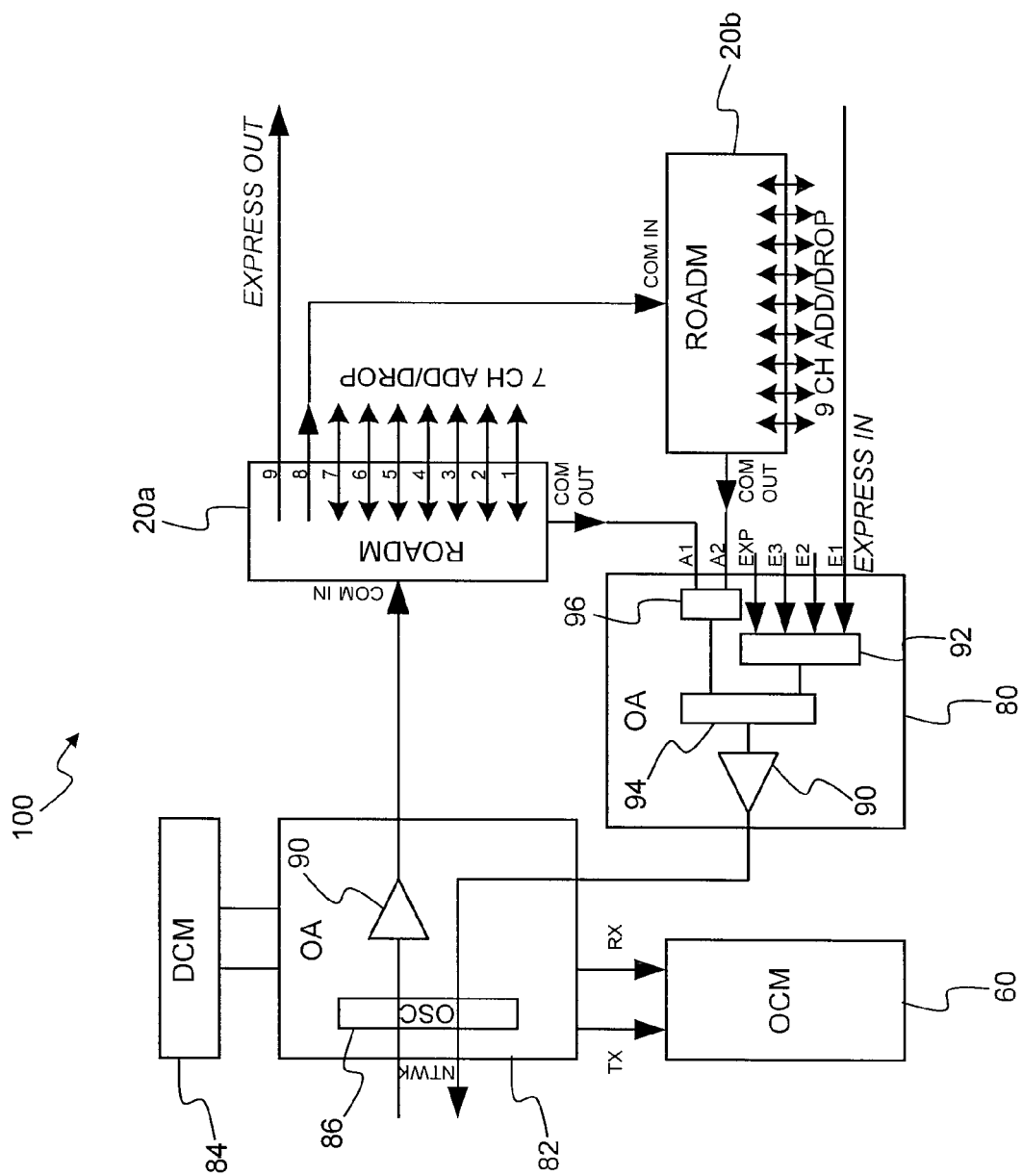
FIG. 6 is a block diagram illustrating an exemplary embodiment of a ROADM in a terminal configuration.
Figure 7:
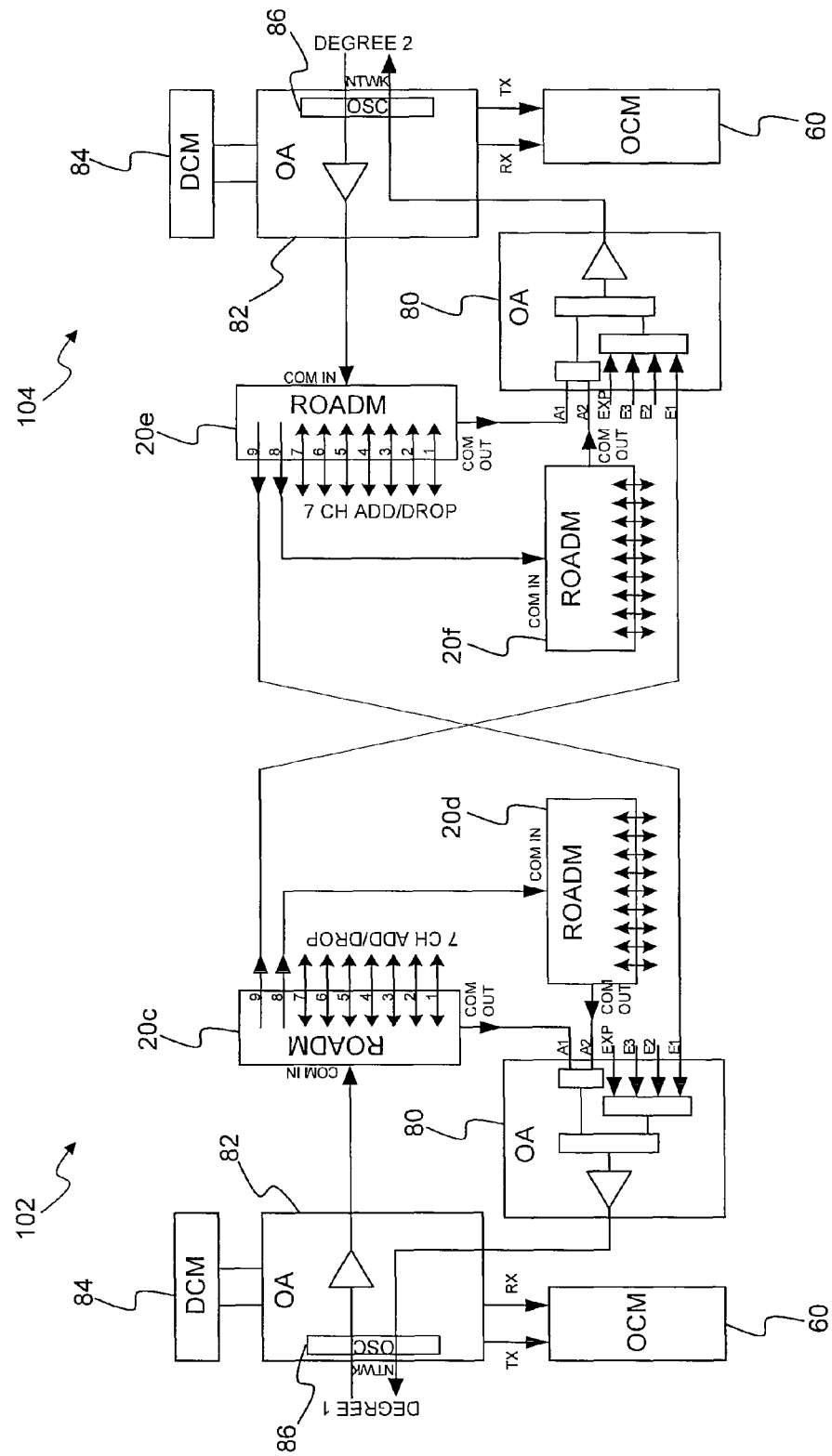
FIG. 7 is a block diagram illustrating an exemplary embodiment of a ROADM in a degree two configuration.
Figure 8:
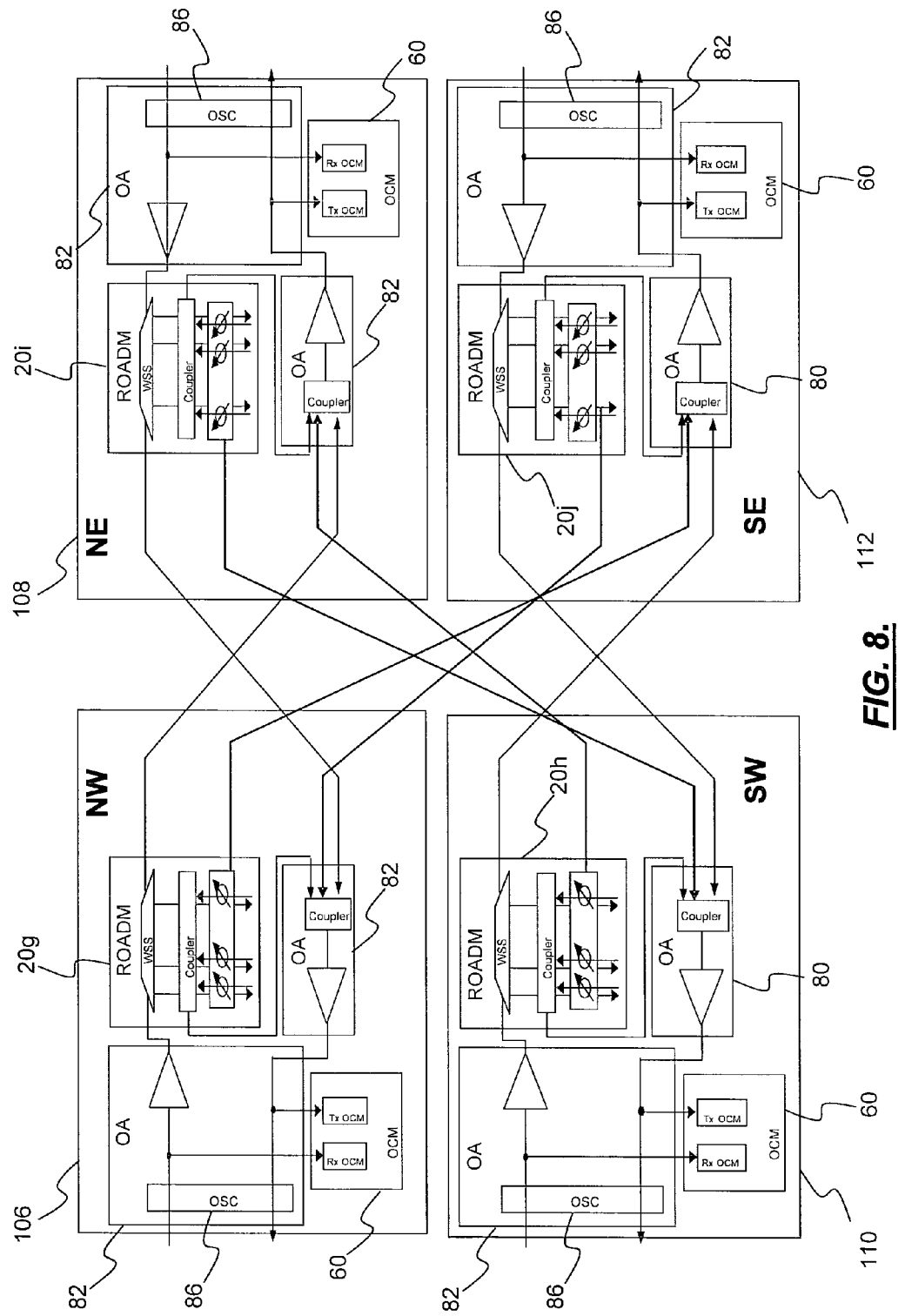
FIG. 8 is a block diagram illustrating an exemplary embodiment of a ROADM in a degree four configuration.

Referring to FIGS. 6, 7, and 8, exemplary embodiments of ROADM nodal configuration are illustrated in terminal, degree two, and degree four configurations. Advantageously, ROADMs can be in multiple degree configurations, where each degree represents the external fiber connection to the network. For example, a terminal (or degree one) configuration supports adds and drops from one external network connection (i.e., a pair of transmit and receive fibers to the external network) as illustrated in FIG. 6. A degree two configuration supports adds and drops from two external network connections (i.e., two pairs of transmit and receive fibers to the external network, such as an East-West fiber pair) as illustrated in FIG. 7. A degree four configuration supports adds and drops from four external network connections (i.e., four pairs of fibers) as illustrated in FIG. 8.

In general, ROADM nodal configurations 100-112 include ROADMs 20, optical channel monitors (OCM) 60, optical amplifiers (OA) 80,82, dispersion compensation modules (DCMs) 84, and optical service channel (OSC) modules 86. The OAs 80,82 amplify multiple wavelengths. OAs 80,82 include a gain medium 90, such as an erbium doped fiber amplifier (EDFA), semiconductor optical amplifier (SOA), Raman amplifier (RA), or the like. In the exemplary embodiments of FIGS. 6, 7, and 8, OA 82 is configured on the receive side (e.g., pre-amplifier), and OA 80 is configured on the transmit side (e.g., post amplifier). Both of the OAs 80,82 are connected to a fiber for the external network connection (i.e., degrees). The OA 80 includes multiple inputs connected to couplers 92, 94, 96 allowing multiple express channels to be added in addition to inputs from common out ports of ROADM 20 modules.

The DCM 84 module provides chromatic dispersion compensation and possibly dispersion slope compensation, and can include dispersion compensating fiber (DCF) or the like. The DCM 84 can be included in a mid-stage access point of the OA 80,82. The OCM 60 provides per-channel power monitoring of each wavelength, and the OCM 60 can be connected to the OA 82 through a monitoring port. The OSC 86 provides an in-band or out-of-band signal for communications between nodes. For example, the OSC 86 can be a 1510 or 1625 nm wavelength which is dropped at every node for communications. Advantageously, the OSC 86 provides nodal communications between ROADM nodes and can be used to provide each node with individual channel powers.

FIG. 6 illustrates the ROADM nodal configuration 100 configured to add/drop 16 channels through two ROADMs 20a,b. The first ROADM 20a receives an input from the OA 82 including multiple optical channels, and provides seven add/drop channels, one port to the second ROADM 20b for additional add/drop channels, and one port as an express out port. Also, the ROADM 20a includes a common out port which connects to the OA 80 for transmission to the network. The second ROADM 20b receives an input from ROADM 20a which includes all of the channels for add/drop which are not added/dropped on ROADM 20a. The ROADM 20b includes a common out port which is multiplexed with the common out from ROADM 20a by the coupler 96 in the OA 80.

FIG. 7 illustrates the ROADM nodal configuration 102,104 configured to add/drop 16 channels per fiber pair in two degrees through ROADMs 20c, 20d, 20e, 20f. This configuration 102,104 supports two external fiber pairs, such as an East-West network connection, and can add/drop a total of 16 channels in each direction from ROADMs 20c, 20d, 20e, 20f. Express channels are passed directly between the ROADMs 20c, 20d, 20e, 20f, providing optical pass-through. FIG. 8 illustrates the ROADM nodal configuration 106, 108, 110, 112 configured to add/drop 16 channels per fiber pair in four degrees through ROADMs 20g, 20h, 20i, 20j. This configuration 106, 108, 110, 112 supports four external fiber pairs, such as a North-South-East-West network connection, and can add/drop a total of 16 channels in each direction from ROADMs 20g, 20h, 20i, 20j. Express channels are passed directly between the ROADMs 20g, 20h, 20i, 20j, providing optical pass-through from any one of the four fiber pairs to any other pair.

Figure 9:
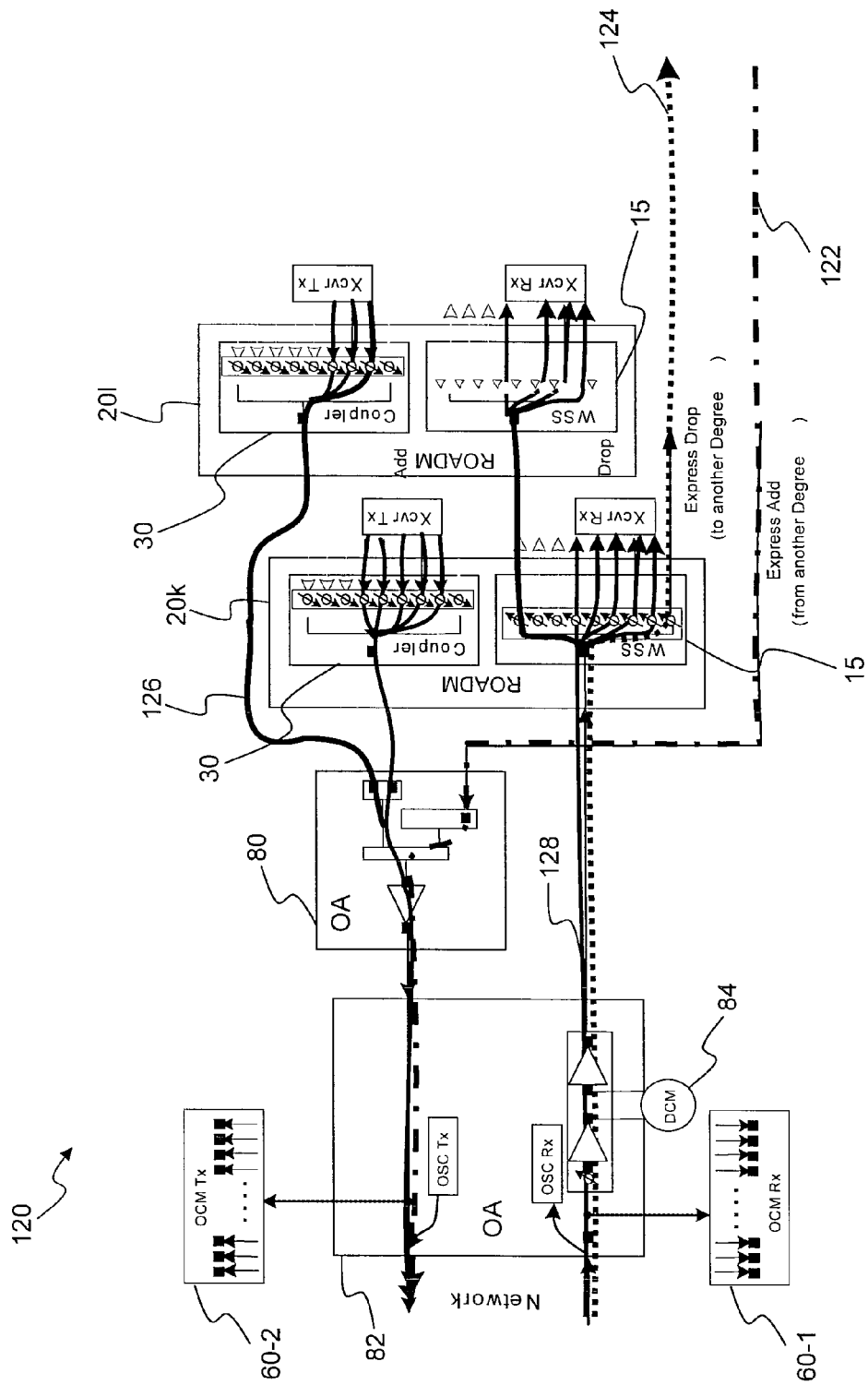
FIG. 9 is a block diagram illustrating an exemplary embodiment of degree power control in a ROADM along the optical paths.

Referring to FIG. 9, an exemplary embodiment of power control at a ROADM nodal configuration 120 is illustrated along optical paths 122, 124, 126, 128. ROADM nodal configuration 12 includes automatic power control for added, dropped and express channels. This automatic power control utilizes adjustable VOAs along the optical paths 122, 124, 126, 128 for independent per-wavelength control for added/dropped/express channels. Again, here ROADMs 20k,20l are used to adjust the channels in the drop and express directions, and Mux VOAs on couplers 30 are used to adjust the channels in the add direction. Additionally, the power can also be adjusted across multiple wavelengths where they are multiplexed together (e.g., add channels). The present invention performs adaptive power control to maintain the correct amplifier target power in response to side-lobe size and OSNR at each amplifier. Advantageously, power control per-wavelength enables the power to be modified according to system information about the side-lobe, OSNR, ASE level, etc.

The optical path 122 represents input express channels, and is input to OA 80 for multiplexing with other channels, post amplification, and OSC addition prior to external transmission. The optical path 122 does not require any power control through VOAs because the path 122 comes from an express drop off of another ROADM nodal configuration (not shown) where its power can be adjusted. The optical path 124 represents output express channels, and is received through OA 82 for pre amplifications, and then sent to the WSS 15 in the ROADM 20k. In the WSS 15, the path 124 is sent to an express drop port which includes an adjustable VOA to modify the power level. As described above, path 124 is input as path 122 to another ROADM.

The optical path 126 represents input channels which are added locally at the nodal configuration 120. The channels in the path 126 are individually input into ports on the ROADMs 20k,20l where they are sent to couplers 30 which include adjustable VOAs to control the power level of each channel. The optical path 128 represents output channels which are dropped locally at the nodal configuration 120. The channels in the path 128 are received by WSSs 15 in ROADMs 20k,20l. As described herein, the WSSs 15 de-multiplex each channel and include an adjustable VOA to change the channel power. The de-multiplexed channels after the VOAs are sent to output ports for the local drops.

Figure 10:
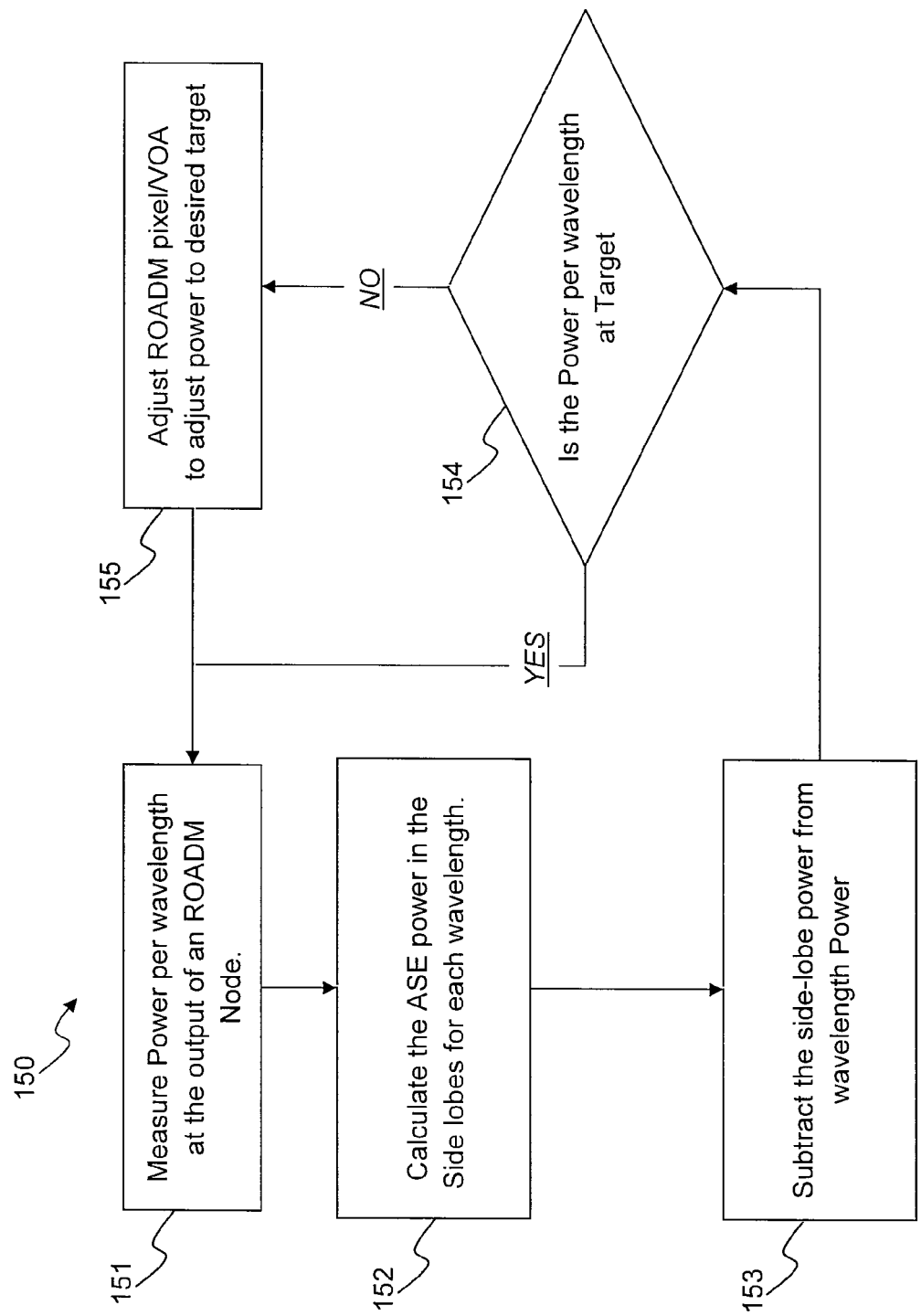
FIG. 10 is a flowchart illustrating an exemplary embodiment of adaptive power control in amplifiers to calculate ASE and to adjust VOA settings in order to compensate for an OSNR penalty caused by the side-lobes created by ROADMs.

Referring to FIG. 10, a flowchart 150 illustrates an exemplary embodiment of the present invention to calculate ASE and to adjust VOA settings in order to compensate for an OSNR penalty caused by the side-lobes created by ROADMs. First, optical power is measured per wavelength at the output of an ROADM node (step 151). As described herein, an OCM can be utilized with the ROADM to provide per wavelength optical power. Alternatively, the ROADM node can include built-in power monitors or any other means for measuring per wavelength optical power.

Next, the ASE power in the side-lobes for each wavelength is calculated (step 152). This calculation is based on the channel path, i.e. the number of ROADMs the channel passes through, the ROADM settings, etc. The adaptive amplifier control of the present invention can correctly estimate the amount of ASE with knowledge of the system and correlation between side-lobe size and WSS channel attenuation. The ASE level and the side lobe size are calculated based on the amplifier gain, noise figure, and the attenuation settings. Along the channel path, the settings (e.g., VOA attenuation) on each ROADM and operating conditions (e.g., power levels) are known at each amplifier. The ASE power in the side-lobes is zero where WSS attenuation is 0 dB at all ROADMs in the optical path (i.e., there is no side-lobe). Where there is no side-lobes, the ASE is calculated based on amplifier noise figure (NF), amplifier gain, and span loss.

With side-lobes (i.e., WSS attenuation>0 dB at one or more ROADMs in the optical path), a formula can be derived to calculate additional ASE accumulated due to the side-lobes caused by the WSS. The side lobe penalty is the ratio of the ASE with side-lobes compared to the ASE power without side-lobe (as attenuation is equal to 0 dB). The additional ASE power in the side lobe is calculated from the OSNR. Once the additional power is calculated in all the side-lobes, the amplifier output power is increased by that value.

Figure 12B:
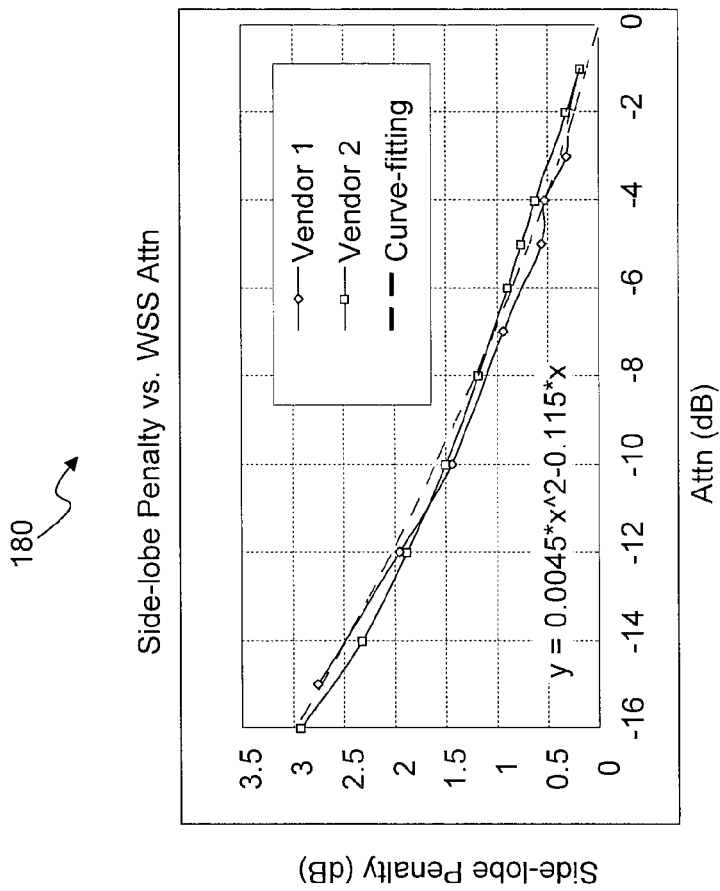
FIGS. 12a-12b are graphs illustrating side lobes relative to signal and noise and the side-lobe OSNR penalty versus WSS attenuation settings.
Figure 12A:
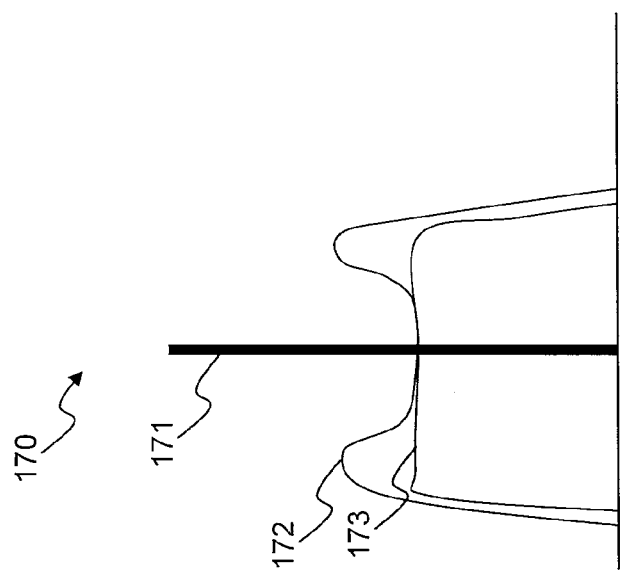

Referring to FIGS. 12a-12b, graph 170 illustrates a spectral plot of signal 171 to noise without side-lobe 173 and to noise with side-lobe 172, and graph 180 illustrates a derived formula for calculating the side lobe penalty. The noise without side-lobe 173 represents standard ASE noise, and is calculated based on amplifier noise figure (NF), amplifier gain, and span loss. The noise with side-lobe 172 represents standard ASE noise plus side-lobe noise added by a WSS. The side-lobe penalty is defined as a ratio (in dB) of ASE with side-lobe 172 divided by ASE without side-lobe 173.

Applicants have determined that the side-lobe penalty caused by WSS attenuation correlates to the attenuation setting, and that this penalty is similar across different vendors WSS systems as illustrated in graph 180. The side-lobe penalty is calculated at each node according to a derived formula based on the WSS attenuation. In one embodiment, this formula is defined as:

$$\text{Side-Lobe\_Penalty}=0.0045x^2-0.115x$$

where x equals the WSS attenuation setting in dB. This formula is derived from experimental data taken by altering WSS attenuation and measuring the responsive side-lobe power. Those of ordinary skill in the art will recognized that this formula can be modified for different WSS vendors accordingly. So, once given WSS attenuation, side-lobe in the input signal (from uplink), and ASE level under signal peak, the ASE power in the side-lobes at the output can be calculated.

Next, the side-lobe power is subtracted from the wavelength power (step 153). The side-lobe power is the side-lobe penalty calculated in step 152. The system checks to see if the power per wavelength is at the target power (step 154). The target power represents the power required per wavelength to achieve the desired system performance (e.g., BER of $10^{-15}$, Q>9, etc.). This value is fixed depending on the system configuration (e.g., # of wavelengths, distance, etc.). If the power per wavelength is at its target value, then nothing is done and the flowchart 150 goes back to step 151. If the power per wavelength is not at the target value, then ROADM pixel/VOA are adjusted to adjust the wavelength power to the desired target (step 155). As described herein, ROADM nodes provide the ability to modify per wavelength power by adjusting VOA settings. Additionally, the ROADM can adjust pixel settings to adjust wavelength power. The flowchart 150 is performed for each wavelength, and can be run adaptively to provide continuous power adjustment.

Figure 11:
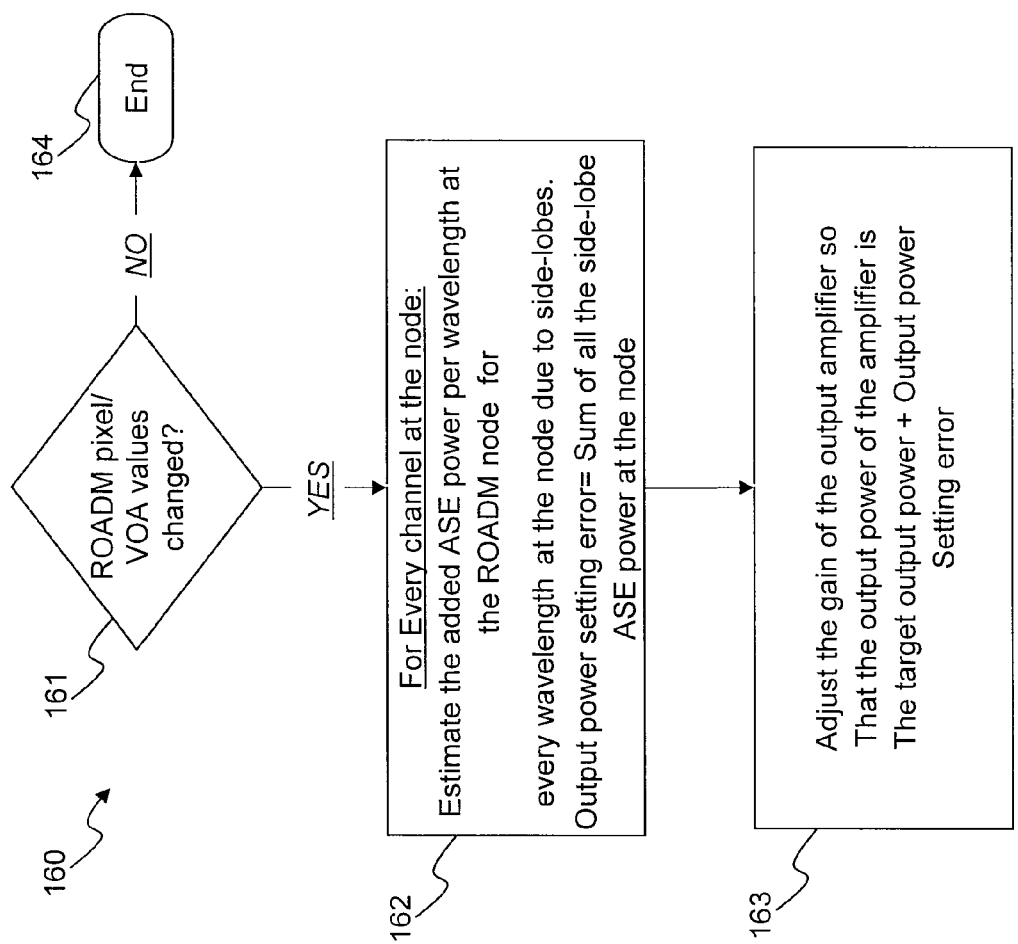
FIG. 11 is a flowchart illustrating an exemplary embodiment of adaptive power control in amplifiers to adjust amplifier power responsive to VOA settings changing.

Referring to FIG. 11, flowchart 160 illustrates an exemplary embodiment of adaptive power control in amplifiers to adjust amplifier power responsive to pixel/VOA settings changing. Flowchart 160 is run at every ROADM node and is re-run each time ROADM pixel/VOA values change. First, have the ROADM pixel/VOA values changed (step 161)? If not, then flowchart 160 ends (step 164).

If so, the added ASE power per wavelength at the ROADM node for every wavelength at the node due to side-lobes is estimated (step 162). This estimate is the output power setting error of the amplifier and it equals the sum of all the side-lobe ASE powers at the node. Next, the gain of the output amplifier is adjusted so that the output power of the amplifier is the target output power plus the output power setting error (step 163). This adjusts the amplifier output power to account for the side-lobes. The target amplifier output power is defined based on parameters, such as # of wavelengths, span loss, and the like.

Flowcharts 150 and 160, respectively, form two control loops with flowchart 150 controlling per wavelength output power to compensate for the side-lobe penalty, and flowchart 160 controlling amplifier output power to compensate for the side-lobe penalty across all wavelengths. Advantageously, these loops are run together with a change in flowchart 150 prompting flowchart 160 to adjust amplifier power. These two control loops overcome the OSNR penalty due to accumulated ASE noise in side-lobes by ensuring each wavelength and each amplifier is at its target power values.

Figure 13:
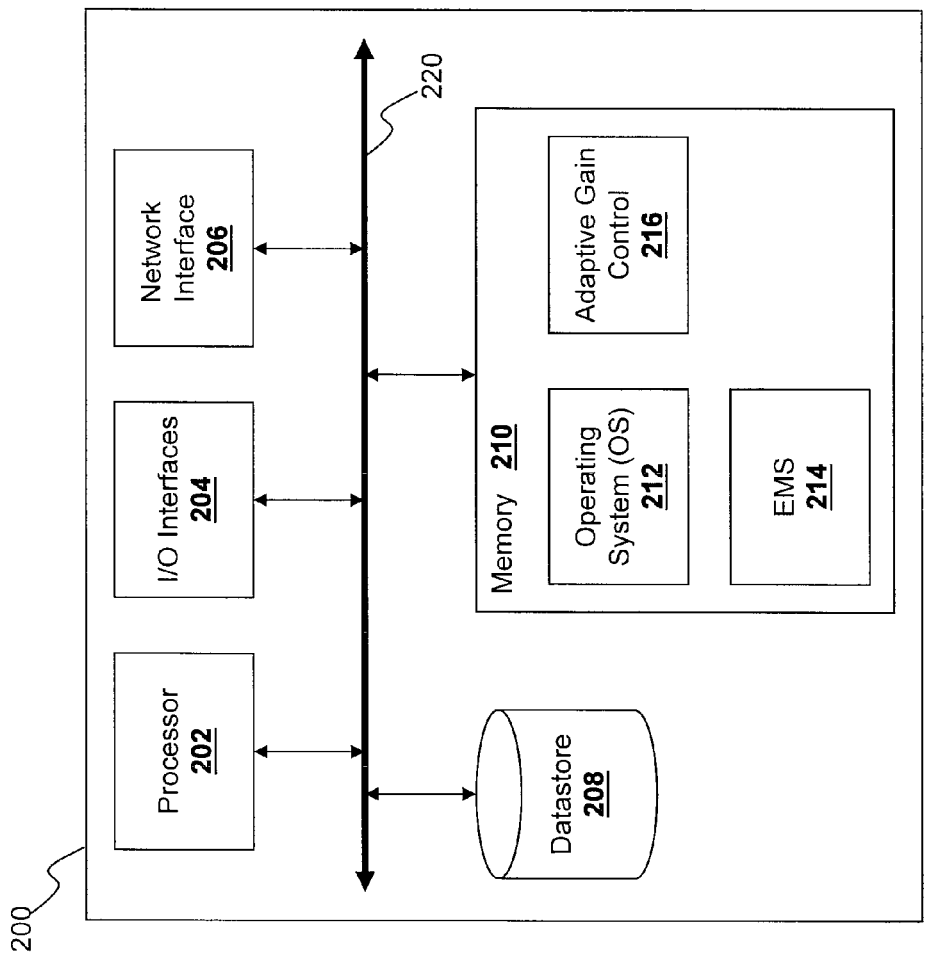
FIG. 13 is a block diagram of a server utilized to perform adaptive gain control.

Referring to FIG. 13, a block diagram illustrates a server 200 having an adaptive gain control 216 engine, according to an exemplary embodiment of the present invention. The server 200 can be a digital computer that, in terms of hardware architecture, generally includes a processor 202, input/output (I/O) interfaces 204, network interfaces 206, memory 210, and a data store 208. The components (202, 204, 206, 208, and 210) are communicatively coupled via a local interface 220. The local interface 220 can be, for example but not limited to, one or more buses or other wired or wireless connections, as is known in the art. The local interface 220 can have additional elements, which are omitted for simplicity, such as controllers, buffers (caches), drivers, repeaters, and receivers, among many others, to enable communications. Further, the local interface 220 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions.

The I/O interfaces 204 can be used to receive user input from and/or for providing system output to one or more devices or components. User input can be provided via, for example, a keyboard and/or a mouse. System output can be provided via a display device and a printer (not shown). I/O interfaces 204 can include, for example, a serial port, a parallel port, a small computer system interface (SCSI), an infrared (IR) interface, a radio frequency (RF) interface, and/or a universal serial bus (USB) interface.

The network interfaces 208 can be used to enable the server 200 to communicate on a network. For example, the server 200 can utilize the network interfaces 206 to communicate to multiple ROADM nodes. Each ROADM can include a network interface to communicate to the server 200 for OAM&P, such as for providing per channel output power and for receiving instructions from the server 200 responsive to the adaptive gain control 216 engine. The network interfaces 206 can include, for example, an Ethernet card (e.g., 10BaseT, Fast Ethernet, Gigabit Ethernet) or a wireless local area network (WLAN) card (e.g., 802.11a/b/g). The network interfaces 206 can include address, control, and/or data connections to enable appropriate communications on the network.

A data store 208 can be used to store data, such as information received from NEs. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 200 such as, for example, an internal hard drive connected to the local interface 220 in the server 200. Additionally in another embodiment, the data store can be located external to the server 200 such as, for example, an external hard drive connected to the I/O interfaces 204 (e.g., SCSI or USB connection). Finally in a third embodiment, the data store may be connected to the server 200 through a network, such as, for example, a network attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 can have a distributed architecture, where various components are situated remotely from one another, but can be accessed by the processor 202.

The software in memory 210 can include one or more software programs, each of which includes an ordered listing of executable instructions for implementing logical functions. In the example of FIG. 13, the software in the memory system 210 includes the adaptive gain control 216 engine and a suitable operating system (O/S) 212. The operating system 212 essentially controls the execution of other computer programs, such as the adaptive gain control 216 engine, and provides scheduling, input-output control, file and data management, memory management, and communication control and related services. The operating system 212 can be any of Windows NT, Windows 2000, Windows XP, Windows Vista (all available from Microsoft, Corp. of Redmond, Wash.), Solaris (available from Sun Microsystems, Inc. of Palo Alto, Calif.), or LINUX (or another UNIX variant) (available from Red Hat of Raleigh, N.C.).

The server 200 can operate as an element management system (EMS), network management system (NMS), or the like operable to manage nodes in a network. For example, the server 200 can include an EMS program 214 loaded in the memory 210. The EMS program 214 can provide operations, administration, maintenance, and provisioning (OAM&P) access to nodes in the network. In one embodiment, the server 200 is a circuit pack configured to fit in a node in the network, such as an ROADM. The circuit pack communicates to a backplane in the node and also to other nodes through a communication channel in the network, such as an optical service channel (OSC), signal overhead, or through an external data network. In another embodiment, the server 200 is a stand-alone device communicating to nodes in the network through an external data network.

In an exemplary embodiment of the present invention, the adaptive gain control 216 engine is configured to perform flowcharts 150 and 160 depicted in FIGS. 10 and 11, respectively. The adaptive gain control 216 engine communicates to all of the ROADM nodes in the network either directly or indirectly to receive power readings for each wavelength, and to perform adaptive gain control responsive to the power readings and ROADM settings.

Figure 14:
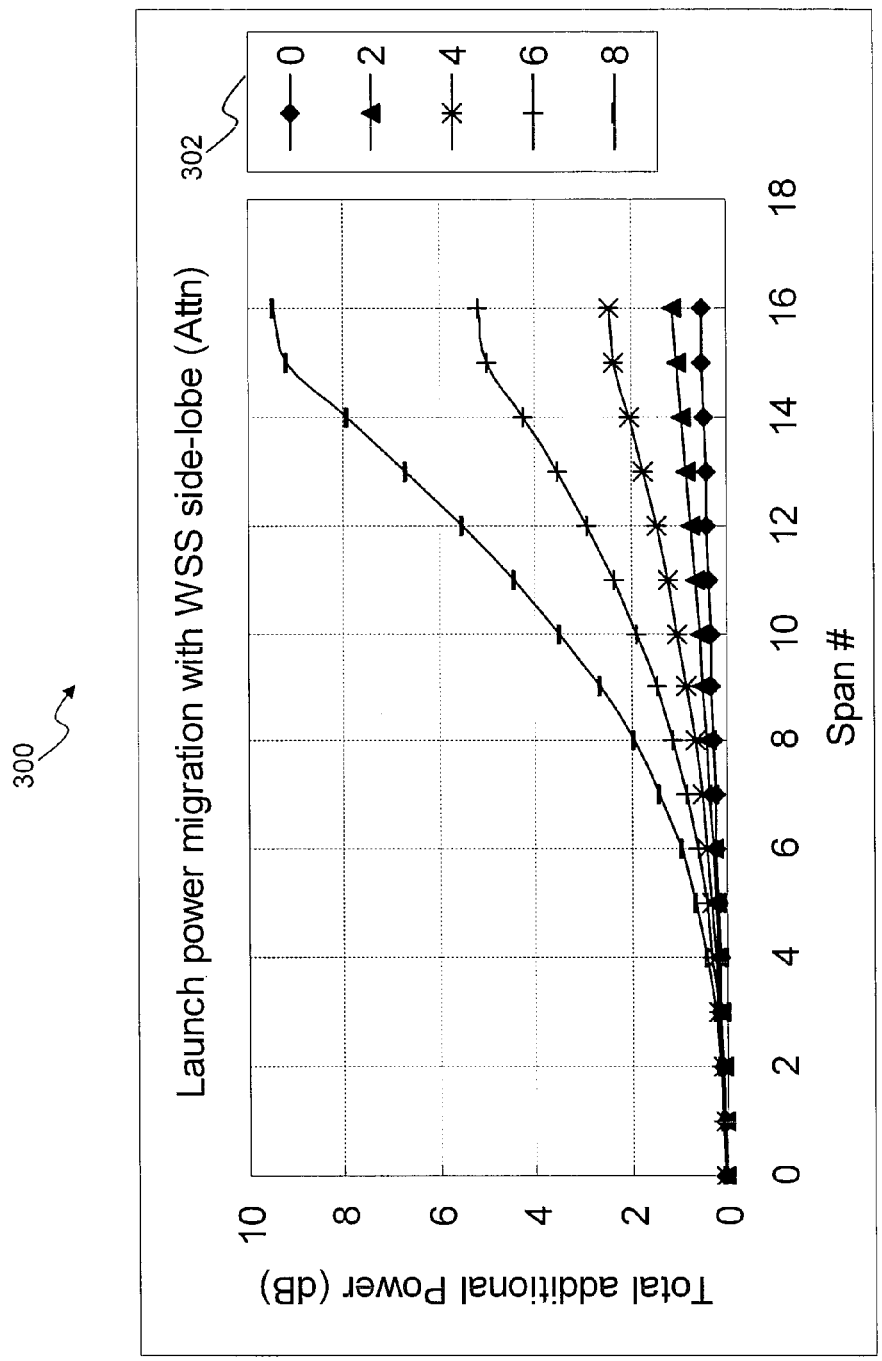
FIG. 14 is a graph illustrating additional amplifier power required versus number of spans for various attenuation settings to compensate side-lobe related penalty.

Referring to FIG. 14, the adaptive amplifier gain control scheme presented herein eliminates the additional noise caused by the side-lobes if all the amplifiers do not max out their output power. However, the adaptive amplifier gain control scheme does consume additional power from an amplifier chain. A graph 300 illustrates additional amplifier power required versus number of spans for various attenuation settings 302 to compensate side-lobe related penalty. The graph 300 represents a calculation with similar conditions as shown in the study in FIG. 3. For example, the additional power required to realize compensation can be as high as 9.5 dB as required for 8 dB attenuation with 16 cascaded ROADMs. In most systems, this creates a limitation on either system reach or channel count. So, the adaptive gain control can be a good solution for systems with either short reach (i.e., with limited ROADMs) or sparse channel plan, but for systems with extended reach and high channel requirements, additional compensation is desired in addition to the adaptive gain control.

In an exemplary embodiment of the present invention, each channel can be filtered at one or more ROADM sites to remove side-lobes. The filter can include a comb filter, such as a thin film filter or an interleaver. These filters can be added to each channel on a WSS associated with the ROADM. As a WSS enhancement, the comb filter is configured to satisfy at least the passband spec of the WSS in order not to create any additional cascading effect. The comb filter also has certain attenuation at frequencies where side-lobes locate to eliminate the side-lobes.

The comb filter can be included on either input or output ports of the WSS 15 in FIG. 4. A comb filter is a purely passive device characterized by minimal temperature dependence, flat-top passband, high channel isolation, low polarization dependent loss (PDL), and uniform insertion loss. Accordingly, it can be easily integrated with the WSS 15. Additionally, ROADMs 20 can be configured with the WSS 15 equipped with the comb filter. The present invention contemplates utilizing the comb filter WSS along with WSSs without comb filters in combination for network deployments. For example, WSSs with comb filters can be deployed at locations where amplifiers are close to a maximum output power. At other locations, the adaptive gain control scheme can compensate for the side-lobes without requiring the comb filters.

Figure 15:
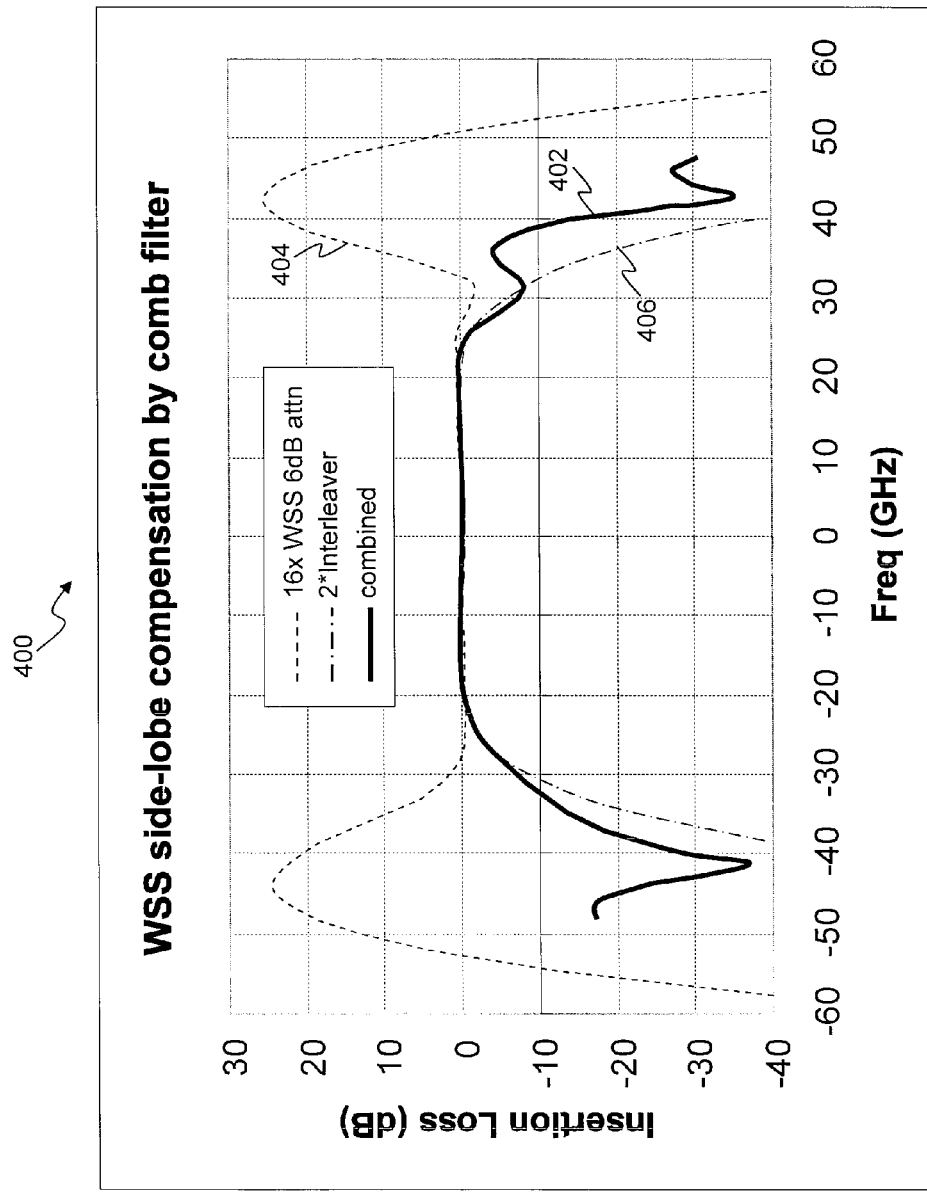
FIG. 15 is a graph illustrating a profile of a comb filter, a profile of a 16 span WSS at 6 dB attenuation, and a profile of an output of the comb filter, according to an exemplary embodiment of the present invention.

Referring to FIG. 15, a graph 400 illustrates a profile of a comb filter 402, a profile of a 16 span WSS at 6 dB attenuation 404, and a profile of an output 406. The comb filter 402 is an interleaver. As shown in the profile of the output 406, the comb filter 402 removes the side-lobes of the profile 404 with little sacrifice of the passband bandwidth. Note, the comb filter 402 can be configured to filter multiple channels for a DWDM signal input. Here, each passband is configured according to the DWDM center frequency spacing and the side-lobe attenuation off the center frequency.

Figure 2B:
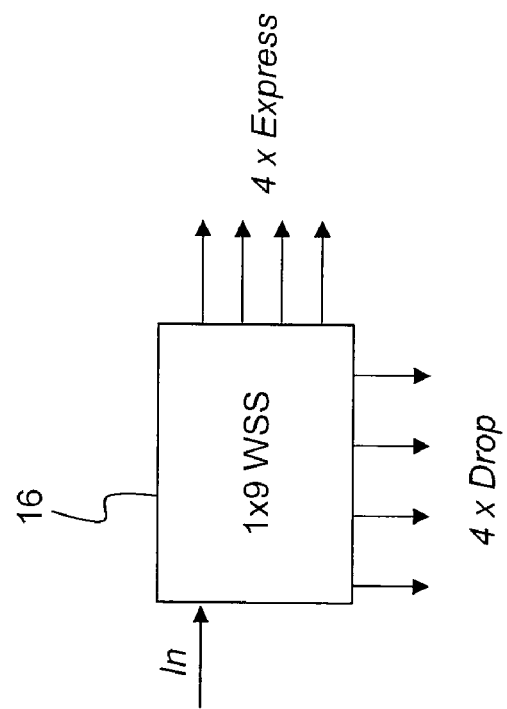
FIGS. 2a-2b are block diagrams of 1×9 WSS in an exemplary embodiment.
Figure 2A:
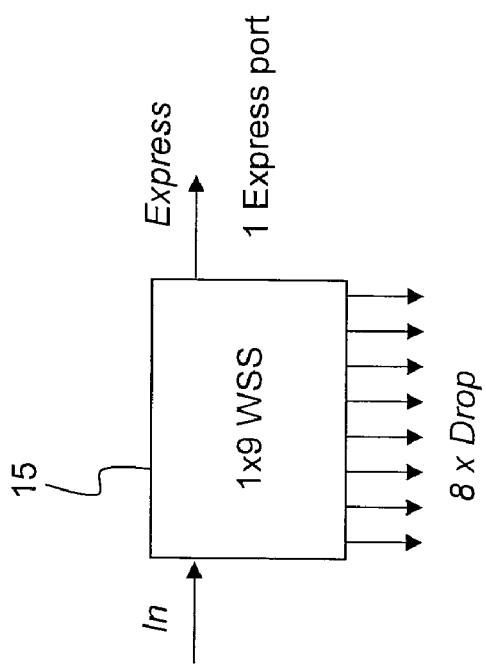
Figure 16B:
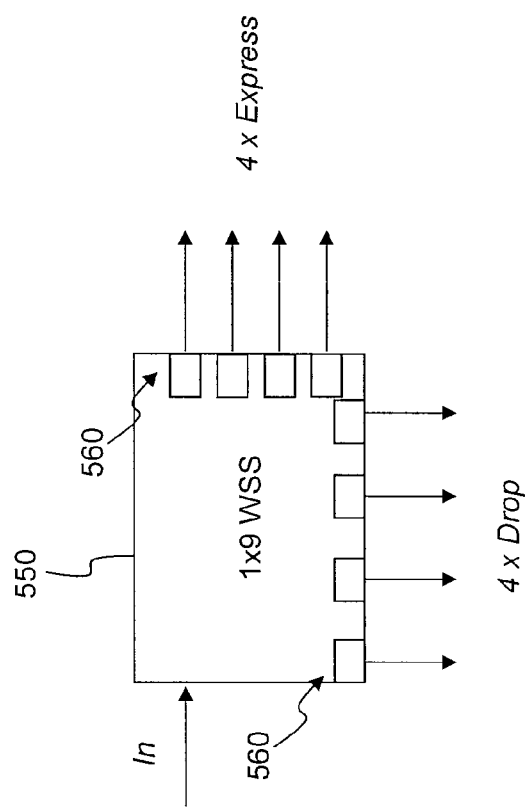
FIGS. 16a-16b are block diagrams illustrating WSSs configured with a comb filter on WSS output ports according to an exemplary embodiment of the present invention.
Figure 16A:
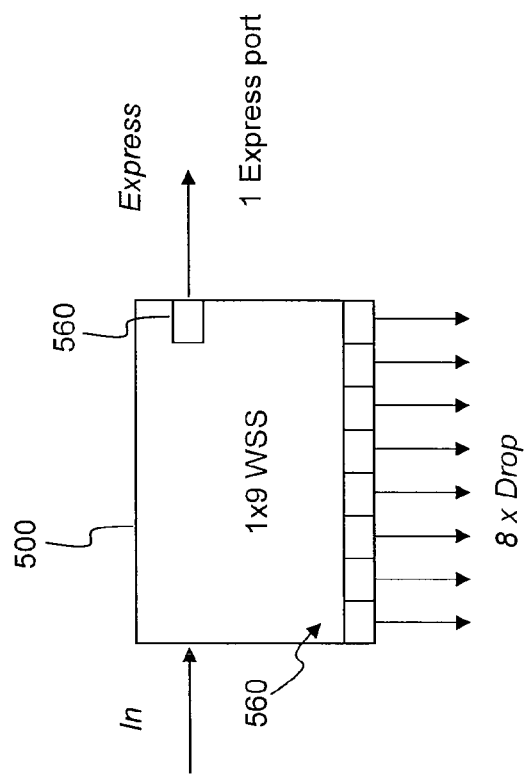

Referring to FIGS. 16a and 16b, WSSs 500,550 are configured with a comb filter 560 at WSS 500,550 output ports according to an exemplary embodiment of the present invention. The WSSs 500,550 are similar to the WSSs 15,16, respectively, in FIGS. 2a and 2b. The WSSs 500,550 are configured to direct each wavelength from a common input port to any one of multiple (e.g., "N") output ports. To indicate device fan out, these devices are often classified as "1×N" devices, with a "1×9" WSS meaning a 10 port device, with 1 common input and 9 output ports. For example, the WSS 500 is a 1×9 WSS with a common input, eight drop ports, and one express port. The WSS 500 can be utilized at a node where up to eight optical signals need to be dropped, with the remaining optical signals pass through as express signals. Alternatively, the WSS 550 utilizes the same hardware configured for multiple express ports, such as where a node has multiple degree interconnection. Advantageously, the WSS 500,550 provides nodal flexibility to add, drop, and express optical signals with the same MEMS-based hardware.

Figure 17B:
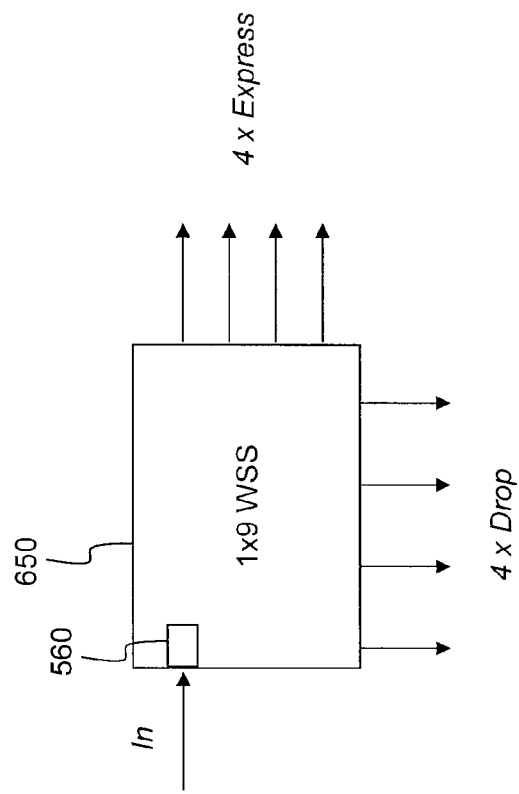
FIGS. 17a-17b are block diagrams illustrating WSSs configured with a comb filter on WSS input ports according to an exemplary embodiment of the present invention.
Figure 17A:
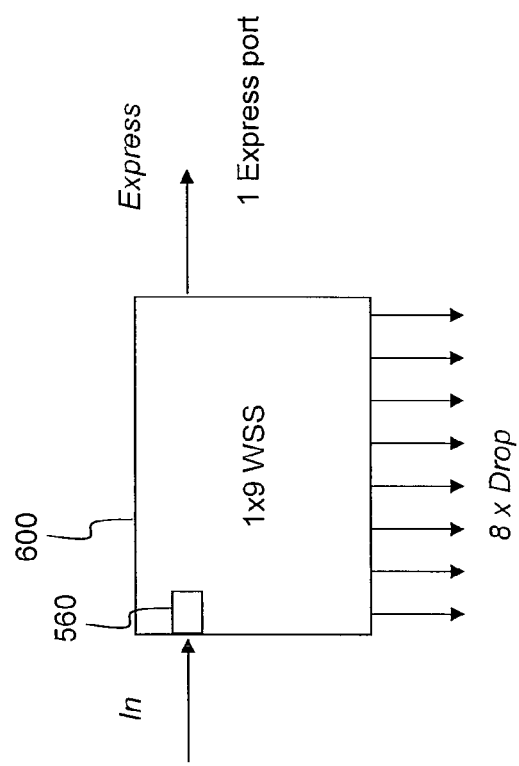

Referring to FIGS. 17a and 17b, WSSs 600,650 are configured with a comb filter 560 at WSS 600,650 input ports according to an exemplary embodiment of the present invention. The WSSs 600,650 are similar to the WSSs 15,16, respectively, in FIGS. 2a and 2b. The WSSs 600,650 are configured to direct each wavelength from a common input port to any one of multiple (e.g., "N") output ports. To indicate device fan out, these devices are often classified as "1×N" devices, with a "1×9" WSS meaning a 10 port device, with 1 common input and 9 output ports. For example, the WSS 600 is a 1×9 WSS with a common input, eight drop ports, and one express port. The WSS 600 can be utilized at a node where up to eight optical signals need to be dropped, with the remaining optical signals pass through as express signals. Alternatively, the WSS 650 utilizes the same hardware configured for multiple express ports, such as where a node has multiple degree interconnection. Advantageously, the WSS 600,650 provides nodal flexibility to add, drop, and express optical signals with the same MEMS-based hardware.

Each of the WSSs 500,550 include switching hardware, such as MEMS mirrors or liquid-crystal modulators (LCM). In FIGS. 16a and 16b, WSSs 500,550 include comb filters 560 or the like on each output port. In FIGS. 17a and 17b, WSSs 600,650 include the comb filter 560 on an input port. These filters 560 are configured to provide a flat passband, but to attenuate the side-lobes caused by the switching hardware as described herein. Each of the filters 560 can be configured with passbands at multiple center frequencies corresponding to the wavelengths associated with a DWDM system.

The WSSs 500, 550, 600, 650 can be utilized to form ROADM network elements for network deployment, such as the ROADMs described herein. For optimal compensation of the OSNR penalty due to side-lobes, ROADMs with the WSSs 500, 550, 600, 650 can be utilized in conjunction with the adaptive gain control mechanisms described herein.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims. Those of ordinary skill in the art understand the terms channel and wavelength are often used interchangeably, and that a channel represents a transmit and receive connection and a wavelength can provide one of the transmit or receive connections.

What is claimed is:

1. A reconfigurable optical add-drop multiplexer node with side-lobe compensation, comprising:
    an optical pre-amplifier comprising an input with multiple wavelengths;
    a wavelength selective switch connected to the optical pre-amplifier, wherein the wavelength selective switch comprises a variable optical attenuator on a connection from the optical pre-amplifier and a filter for each of the multiple wavelengths, and wherein the wavelength selective switch is configured to drop a plurality of wavelengths of the multiple wavelengths;
    an optical post-amplifier connected to a coupler comprising a variable optical attenuator on each of a plurality of input ports, wherein the coupler is configured to add a second plurality of wavelengths; and
    an optical monitor configured to monitor optical power of each of the multiple wavelengths at the optical pre-amplifier;
    wherein each of the variable optical attenuators is adaptively adjusted responsive to amplified spontaneous emission power located in side-lobes of each of the multiple wavelengths calculated responsive to a derived formula for a side-lobe penalty based on a micro-electromechanical system-based wavelength selective switch attenuation with the side-lobe penalty defined as a ratio of amplified spontaneous emission with side-lobe and amplified spontaneous emission without side-lobe; and
    wherein a gain of each of the optical pre-amplifier and the optical post-amplifier is set to a target output value plus the sum of the amplified spontaneous emission power located in side-lobes of each of the multiple wavelengths.

2. The reconfigurable optical add-drop multiplexer node of claim 1, wherein the filter comprises a comb filter comprising one of a thin film filter and an interleaver.

3. The reconfigurable optical add-drop multiplexer node of claim 1, wherein the filter is located at one of each of a plurality of outputs of the wavelength selective switch and an input of the wavelength selective switch.

4. The reconfigurable optical add-drop multiplexer node of claim 1, further comprising a node controller communicatively coupled to the optical pre and post-amplifiers, the wavelength selective switch, and the optical monitor, and wherein the node controller is configured to:
    measure power for each wavelength of the multiple wavelengths at a node using the optical monitor;
    calculate amplified spontaneous emission power located in side-lobes of each wavelength; and
    for each wavelength not at a target power value, adjust power of the wavelength responsive to the amplified spontaneous emission power located in side-lobes of each of the multiple wavelengths.

5. The reconfigurable optical add-drop multiplexer node of claim 1, wherein the formula is derived responsive to the wavelength selective switch utilized in the reconfigurable optical add-drop multiplexer.

6. A wavelength selective switch with side-lobe compensation, comprising:
    an input port;
    a plurality of output ports connected to the input port through a switching device, wherein the switching device is configured to switch wavelengths from the input port to each of the plurality of output ports; and a comb filter configured to filter wavelengths input and output from the wavelength selective switch, wherein the comb filter comprises a passband at and around the center frequency of each of the wavelengths and attenuation at side-lobes for each of the wavelengths;

wherein the wavelength selective switch is adaptively adjusted responsive to amplified spontaneous emission power located in side-lobes of each of the wavelengths calculated responsive to a derived formula for a side-lobe penalty based on a micro-electromechanical system-based wavelength selective switch attenuation with the side-lobe penalty defined as a ratio of amplified spontaneous emission with side-lobe and amplified spontaneous emission without side-lobe.

7. The wavelength selective switch with side-lobe compensation of claim 6, wherein the comb filter comprises one of a thin film filter and an interleaver.

8. The wavelength selective switch with side-lobe compensation of claim 6, wherein the switching device comprises one of a micro-electromechanical system mirrors and liquid-crystal modulators.

9. The wavelength selective switch with side-lobe compensation of claim 6, wherein the comb filter is located at one of each of a plurality of outputs of the wavelength selective switch and an input of the wavelength selective switch.

10. A wavelength selective switch with side-lobe compensation, comprising:
an input port;
a plurality of output ports connected to the input port through a switching device, wherein the switching device is configured to switch wavelengths from the input port to each of the plurality of output ports; and
a comb filter configured to filter wavelengths input and output from the wavelength selective switch, wherein the comb filter comprises a passband at and around the center frequency of each of the wavelengths and attenuation at side-lobes for each of the wavelengths;
wherein the wavelength selective switch is adaptively adjusted responsive to amplified spontaneous emission power located in side-lobes of each of the wavelengths calculated responsive to a derived formula for a side-lobe penalty based on a micro-electromechanical system-based wavelength selective switch attenuation with the side-lobe penalty defined as a ratio of amplified spontaneous emission with side-lobe and amplified spontaneous emission without side-lobe; and
wherein a gain of an optical pre-amplifier and an optical post-amplifier connected to the wavelength selective switch is set to a target output value plus the sum of the amplified spontaneous emission power located in the side-lobes of each of the wavelengths.

11. The wavelength selective switch with side-lobe compensation of claim 10, wherein the comb filter comprises one of a thin film filter and an interleaver.

12. The wavelength selective switch with side-lobe compensation of claim 10, wherein the switching device comprises one of a micro-electromechanical system mirrors and liquid-crystal modulators.

13. The wavelength selective switch with side-lobe compensation of claim 10, wherein the comb filter is located at one of each of a plurality of outputs of the wavelength selective switch and an input of the wavelength selective switch.

* * * * *